(12) United States Patent
Yuan et al.

(10) Patent No.: US 9,332,494 B1
(45) Date of Patent: May 3, 2016

(54) STATIC SCHEDULE FREQUENCY ADJUSTING TECHNIQUES FOR WIRELESS MIMO NETWORKS

(71) Applicant: Google Inc., Mountain View, CA (US)

(72) Inventors: Yuan Yuan, Sunnyvale, CA (US); Carroll Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 319 days.

(21) Appl. No.: 13/913,629

(22) Filed: Jun. 10, 2013

(51) Int. Cl.
*G08C 17/00* (2006.01)
*H04W 52/02* (2009.01)

(52) U.S. Cl.
CPC ................................ *H04W 52/0209* (2013.01)

(58) Field of Classification Search
CPC ............ H04W 48/08; H04W 52/0229; H04W 52/287; Y02B 60/50
See application file for complete search history.

(56) References Cited

U.S. PATENT DOCUMENTS

| | | | |
|---|---|---|---|
| 2010/0008279 A1* | 1/2010 | Jeon et al. | 370/311 |
| 2010/0105389 A1* | 4/2010 | Chin et al. | 455/436 |
| 2010/0220641 A1* | 9/2010 | Son et al. | 370/311 |
| 2010/0271995 A1* | 10/2010 | Seok et al. | 370/311 |
| 2011/0243570 A1* | 10/2011 | Kim et al. | 398/140 |

* cited by examiner

*Primary Examiner* — Yemane Mesfin
*Assistant Examiner* — Abdelillah Elmejjarmi
(74) *Attorney, Agent, or Firm* — Morris & Kamlay LLP

(57) ABSTRACT

A technique includes communicating with a base station via a transmitter and a receiver of a first client device based on a static schedule. The static schedule indicates an uplink time and a downlink time allocated to the first client device and associated with each of multiple frames of the base station. Communication time between the base station and multiple client devices linked to the base station including the first client device is divided into multiple frames. A mode request signal is transmitted or received and performs one of: (i) requesting operation in a sleep mode for a selected number S of the frames, and (ii) indicating operation in a standby mode. An initiate signal is transmitted from the first client device to the base station via the transmitter and indicates when to begin operating in the one of the sleep mode and the standby mode.

24 Claims, 6 Drawing Sheets

STATIC SCHEDULE FREQUENCY ADJUSTING TECHNIQUES FOR WIRELESS MIMO NETWORKS

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless MIMO network can include, for example, one or more base stations and numerous client devices. Examples of the client devices include cellular phones, computers, notepads, tablets, and personal data assistants. In a wireless MIMO network, time division multiple access (TDMA) based medium access control can be used. The use of TDMA allows multiple client devices to share the same frequency channel by allocating respective time slots to each of the client devices. A base station can control time slot allocation of the client devices.

A client device can exchange data with the base station via a channel in the time slots allocated for that client device. The client device communicates with the base station during allocated and periodic uplink and downlink times provided by the base station. The client device can also access the channel during the allocated uplink and downlink times according to a static schedule to maintain a link between the client device and the base station. The client device consumes power when communicating with the base station and while maintaining a link with the base station.

SUMMARY

A computer-implemented technique is provided and can include communicating with a base station via a transmitter and a receiver of a first client device based on a static schedule. The static schedule can indicate an uplink time and a downlink time allocated to the first client device by the base station. The uplink time and the downlink time can be associated with each of multiple frames of the base station. The communication time between the base station and client devices that are linked to the base station including the first client device can be divided into periodic time intervals. Each of the periodic time intervals includes a respective one of the frames.

The technique can further include selecting between operating in one of a sleep mode and a standby mode. During the sleep mode, the transmitter and the receiver can be deactivated for S ones of the frames, and the transmitter and the receiver can be reactivated subsequent to the S ones of the frames, where S is an integer. During the standby mode, the transmitter and the receiver can be deactivated until a wake up period in which the first client device reactivates the receiver to receive a wake up signal from the base station.

A mode request signal can be transmitted from the first client device to the base station via the transmitter. The mode request signal can perform one of: (i) requesting operation in the sleep mode for the S ones of the frames, and (ii) indicating operation in the standby mode. Subsequent to transmitting the mode request signal to request operation in the sleep mode, a response signal can be received from the base station permitting operation in the sleep mode. An initiate signal can be transmitted from the first client device to the base station via the transmitter based on the response signal. The initiate signal can indicate when to begin operating in the selected one of the sleep mode and the standby mode.

In other features, a computer-implemented technique is provided and can include communicating with a base station via a transmitter and a receiver of a first client device based on a static schedule. The static schedule can indicate an uplink time and a downlink time allocated to the first client device by the base station. The uplink time and the downlink time can be associated with each of multiple frames of the base station. Communication time between the base station and multiple client devices linked to the base station including the first client device can be divided into the frames.

The technique can further include at least one of (i) receiving a mode request signal transmitted from the base station to the first client device via the receiver, and (ii) transmitting the mode request signal from the first client device to the base station via the transmitter. The mode request signal can perform one of (i) requesting operation in a sleep mode for a selected number S of the frames, where S is an integer, and (ii) indicating operation in a standby mode. An initiate signal can be transmitted from the first client device to the base station via the transmitter. The initiate signal can indicate when to begin operating in the one of the sleep mode and the standby mode.

In other features, a computer-implemented technique is provided and can include communicating with a first client device via a transmitter and a receiver of a base station based on a static schedule. The static schedule can indicate an uplink time and a downlink time allocated to the first client device by the base station. The uplink time and the downlink time can be associated with each of multiple frames of the base station. Communication time between the base station and multiple client devices linked to the base station including the first client device can be divided into multiple frames.

The technique can further include at least one of (i) transmitting a mode request signal from the base station to the first client device via the transmitter, and (ii) receiving the mode request signal from the first client device at the base station via the receiver. The mode request signal can perform one of (i) requesting operation in a sleep mode for a selected number S of the plurality of frames, where S is an integer, and (ii) indicating operation in a standby mode. An initiate signal can be received from the first client device from the base station via the receiver. The initiate signal can indicate when to begin operating in the one of the sleep mode and the standby mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
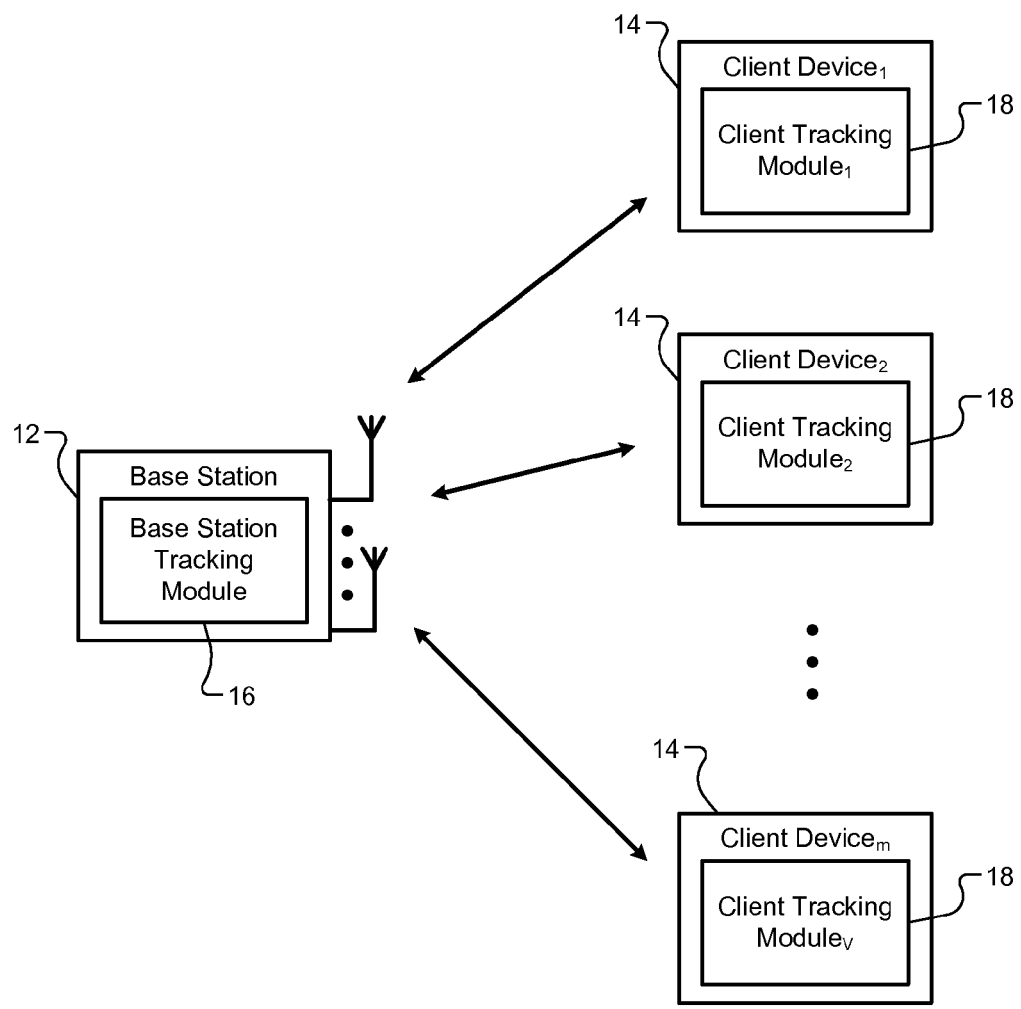
FIG. 1 is a functional block diagram of a wireless MIMO network in accordance with the present disclosure.
Figure 2:
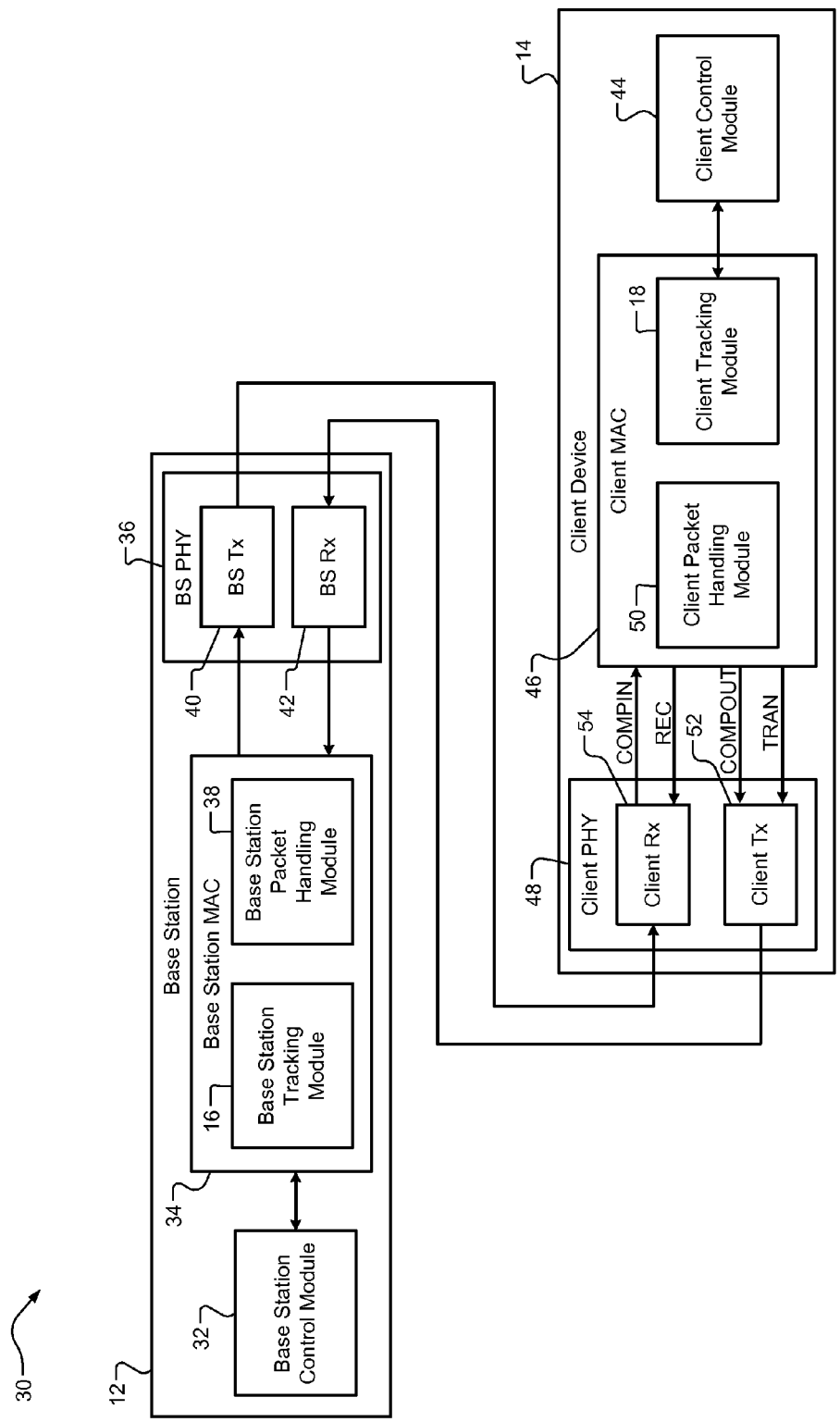
FIG. 2 is a functional block diagram of a portion of the wireless MIMO network of FIG. 1.

In FIG. 1, a wireless MIMO network 10 is shown. The wireless MIMO network 10 includes one or more base stations (one base station 12 is shown) and multiple client devices 14. Multiple base stations can be included to provide a seamless wireless experience for the client devices 14. The base station 12 and the client devices 14 operate to adjust frequency of scheduled uplink and downlink times of the client devices 14 and thus activation and deactivation times of receivers and transmitters of the client devices 14. This can include adjusting reception and transmission timing of the client devices 14. Examples of a receiver and a transmitter of a client device are shown in FIG. 2.

The base station 12 and the client devices 14, in adjusting uplink and downlink timing and reception and transmission timing of the client devices 14, operate to adjust activation and deactivation timing of the receivers and transmitters of the client devices 14. This can include reducing ON times and/or duty cycles of the receivers and transmitters of the client devices 14 to conserve power in the client devices 14. The base station 12 and the client devices 14 operate to reduce frequency of the uplink and downlink times and/or operate to cease allocation of uplink and downlink times for extended periods of time. This further conserves power in the client devices 14.

Transmitter and receiver timing of the client devices 14 are adjusted for signals (e.g., compound signals) transmitted from the client devices 14 to the base station 12 and transmitted from the base station 12 to the client devices 14. A compound signal can be a time division multiple access (TDMA) signal and can include a data signal (e.g., user data signal) and a pilot (or reference) signal. A pilot signal can be transmitted at carrier frequency and modulated with a respective data signal. The pilot signal can be used as a reference signal by the base station 12 to determine signal timing and quality parameters, such as arrival times, time differences, signal quality values, uplink and downlink times, signal strength, signal-to-interference (SIR) ratios, bit error rates (BERs), or other parameters disclosed herein. The data signal and/or the pilot signal can include a sleep mode request signal, a standby mode request signal, a sleep mode response signal, a standby mode response signal, a sleep mode timing signal, and/or a standby mode timing signal (referred to collectively below as the mode signals). The mode signals and corresponding operating modes are described in detail below with respect to FIGS. 3-6.

The signals transmitted between the base station 12 and the client devices 14 can be transmitted in television (TV) whitespace at, for example, 600-800 MHz or at other whitespace or signal transmission frequencies and/or frequency ranges. The other signal transmission frequency ranges can be suitable for transmission of TDMA signals in the MIMO network 10 between the base station 12 and client devices 14.

The base station 12 and each of the client devices 14 can be spread spectrum devices that transmit signals to each other using one or more antennas and receive via respective wideband receivers. The base station 12 can transmit using multiple antennas to communicate with one or more of the client devices 14 at the same time. Each of the client devices 14 can communicate using one or more antennas. Signals transmitted between the base station 12 and the client devices 14 can be transmitted over available TV whitespace frequencies (or available TDMA frequencies), which is referred to as a channel. The channel can include as many as all available and/or selected TV whitespace frequencies unused by TV broadcast providers. The base station 12 and each of the client devices 14 can communicate with each other via the channel using all or a subset of the frequencies assigned to the channel. The same data (or content) may not be transmitted over each of the assigned frequencies, but rather can be spread across the assigned frequencies and transmitted from the base station 12 and received by each of the client devices 14. Each of the client devices 14 can transmit data over the assigned frequencies to the base station 12.

The base station (BS) 12 includes a BS tracking module 16 that divides transmission time allocated to the client devices 14 into frames. Each of the frames can have, for example, 32 slots. Each of the slots can have, for example, 64 symbols. Each of the symbols can have a symbol period of, for example, 17 microseconds. Half of the symbols (or 32 of the 64 symbols) are used for uplink signals transmitted from the client devices to the base station. The other half of the symbols (other 32 of the 64 symbols) are used for downlink signals transmitted from the BS 12 to the client devices 14.

To maintain each of the client devices in a "client active" state, two symbols (identified as static symbols) can be allocated for each of the client devices 14. The first static symbol is used for uplink transmissions. The second static symbol is used for downlink transmission. This allows each of the client devices 14 to access a channel shared by the client devices 14 at least once per frame.

The client devices 14 can be mobile devices or stationary devices. Each of the client devices 14 includes a client tracking module 18. Each of the client tracking modules 18 monitors signals transmitted from the BS 12 to a respective one of the client devices 14 to determine parameters associated with these signals and/or to detect the mode signals.

During operation, the client devices 14 join the wireless MIMO network 10 and establish respective links with the BS 12. Subsequent to a client device joining (i.e. establishing a connection with) the BS 12, the client device is assigned with at least one pair of uplink and downlink symbols of time in a time slot of a static schedule. The static schedule identifies uplink and downlink symbols of time of the client devices 14 connected to and within an area of the BS 12 for each frame of time of the BS 12. The static schedule is stored at the BS 12 and can be shared with the client devices 14 and/or the allocated uplink and downlink symbols of time can be provided from the BS 12 to the client devices 14.

A client device can access a channel to communicate with the BS 12 in allocated uplink and downlink symbols of time provided by the BS 12. The client device can access the channel during the allocated uplink and downlink symbols of time of each frame of the BS 12 according to the static schedule to maintain a link between the client device and the BS 12. The link can be lost when there is no communication activity between the BS 12 and the client device for a predetermined period of time. The BS 12 may no longer allocate uplink and downlink times to the client device when there is no communication activity between the BS 12 and the client device for the predetermined period of time.

Transmitting signals to a BS 12 and receiving signals from a BS 12 consumes power. To reduce power consumption by a client device, the techniques disclosed herein reduce frequency of allocated uplink and downlink times and/or prevent allocation of uplink and downlink times for a client device for extended periods of time. This prolongs power source (e.g., battery) discharge time and/or increases times between power source charges of the client device.

The networks disclosed herein can each be identified as a system. For example, the wireless MIMO network 10 can be identified respectively as a wireless MIMO system.

In FIG. 2, a portion 30 of the wireless MIMO network 10 is shown. The portion 30 includes the BS 12 and one of the client devices 14. The BS 12 includes a BS control module 32, a medium access controller (MAC) 34 and a physical layer device (PHY) 36. The BS control module 32, the BS MAC 34 and/or the BS PHY 36 can be implemented on one or more integrated circuits (ICs).

The BS control module 32 can generate packets in the form of data signals (e.g., user data signals) to be transmitted to the client device 14 and receive other data signals from the client device 14 via the BS MAC 34 and BS PHY 36. The BS MAC 34 can include the BS tracking module 16 and a BS packet handling module 38. The BS tracking module 16 can generate BS pilot signals to be combined with data signals and transmitted as compound signals to the client device 14. The BS tracking module 16 can also track parameters disclosed herein and perform a static schedule frequency adjustment for the client device 14. This includes adjusting frequency of uplink and downlink times of the client device 14.

The BS packet handling module 38 can perform signal conditioning, prepare packets for transmission over a medium and/or network between the BS 12 and the client device 14, and/or prepare packets received from the client device 14 for the BS tracking module 16. The BS PHY 36 can include hardware, such as a BS transmitter 40 and a BS receiver 42.

The client device 14 includes a client control module 44, a client MAC 46 and a client PHY 48. The client control module 44, the client MAC 46 and/or the client PHY 48 can be implemented on one or more ICs. The client control module 44 can generate packets in the form of data signals to be transmitted to the client device 14 and receive other data signals from the client device 14 via the client MAC 46 and client PHY 48. The client MAC 46 can include the client tracking module 18 and a client packet handling module 50.

The client tracking module 18 can generate client pilot signals to be combined with data signals and transmitted as compound signals to the BS 12. The client tracking module 18 can also track parameters disclosed herein and operate to adjust a static schedule frequency of the client device 14. This can include receiving data signals, pilot signals and/or compound signals from and/or transmitting data signals, pilot signals, and/or compound signals to the base station 12. Example compound signals COMPIN, COMPOUT are shown. The data signals, pilot signals and/or compound signals are transmitted between the base station 12 and the client device 14 to adjust frequency of uplink and downlink times of the client device 14.

The client tracking module 18 can also control activation and deactivation timing of hardware in the client PHY 48, such as activation and deactivation timing of a client transmitter 52 and a client receiver 54 of the client PHY 48. The client tracking module 18 can transmit a transmitter power signal TRAN and a receiver power signal REC respectively to the client transmitter 52 and the client receiver 54 to activate (power ON) and/or deactivate (power OFF) the client transmitter 52, the client receiver 54, and/or other devices of the client PHY 48. Although the BS tracking module 16 is shown in the BS MAC 34, the BS tracking module 16 and/or one or more module(s) of the BS tracking module 16 can alternatively be included in the BS PHY 36.

The client packet handling module 50 can perform signal conditioning, prepare packets for transmission on the medium or over a network between the BS 12 and the client device 14, and/or prepare packets received from the BS 12 for the client tracking module 18. Although the client tracking module 18 is shown in the client MAC 46, the client tracking module 18 and/or one or more module(s) of the client tracking module 18 can alternatively be included in the client PHY 48.

Figure 3:
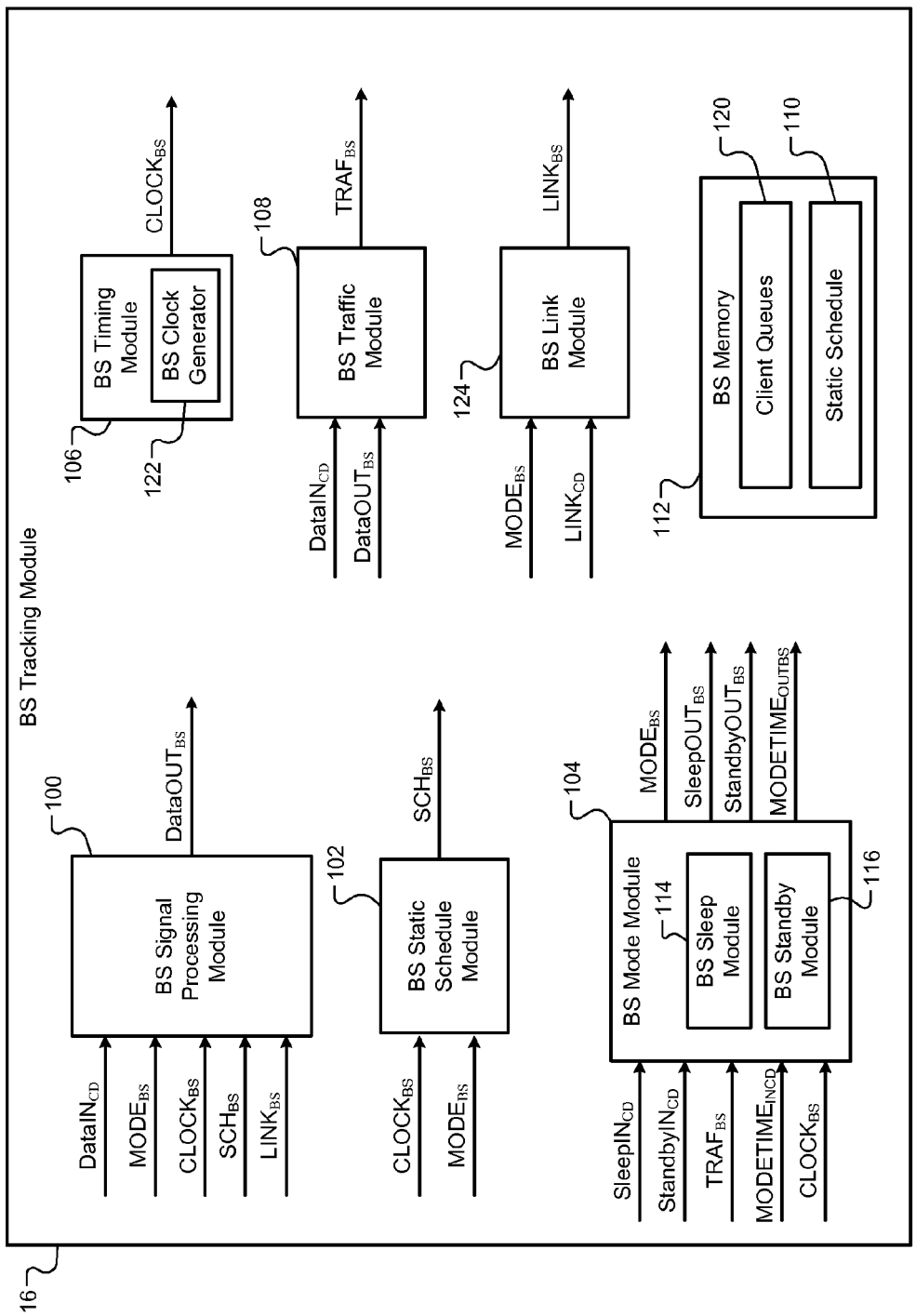
FIG. 3 is a functional block diagram of a base station tracking module in accordance with the present disclosure.

Referring now also to FIG. 3, the BS tracking module 16 is shown. The BS tracking module 16 includes multiple modules and devices that receive, generate and transmit various signals. Although the modules and devices are primarily described with respect to a single client device, the modules and/or devices can communicate with multiple client devices and thus can receive, generate and/or transmit similar signals for each of the client devices.

The BS tracking module 16 coordinates with the client devices 14 timing of active, sleep, and standby modes of the client devices 14. As an example, during an active mode, a transmitter, a receiver, and/or other module(s) and/or device(s) of a client device can be activated (powered ON) and can be in communication with the BS 12. During the sleep mode, the transmitter, the receiver, and/or other module(s) and/or device(s) of the client device can be deactivated (powered OFF) for a requested and/or predetermined number of frames S, where S is an integer. During the standby mode, the transmitter, the receiver, and/or other module(s) and/or device(s) of the client device can be deactivated until the client device has data to send to the BS 12, a periodic beacon interval (or wake up period), and/or the client device receives a wake up signal from the BS 12. During a wake up period, the BS 12 can transmit a beacon signal to establish a link with the client device and/or to determine if the client device is attempting to establish a link with the BS 12. During the sleep and standby modes, the client device may not communicate with the BS 12.

The BS tracking module 16 can include a BS signal processing module 100, a BS static schedule module 102, a BS mode module 104, a BS timing module 106, and a BS traffic module 108. The BS signal processing module 100 receives signals from and transmits signals to client devices 14. The signals receives from and transmitted to the client devices 14 can include, for example, data signals (e.g., user data signals), pilot signals, mode request and/or response signals, beacon (or wake up) signals, link establishing signals, or other communication signals (collectively shown as $DataIN_{CD}$ and $DataOUT_{BS}$).

The BS signal processing module 100 can receive signals from and transmit signals to the client devices 14 based on a static schedule signal $SCH_{BS}$, a mode signal $MODE_{BS}$, and/or a clock signal $CLOCK_{BS}$. The BS static schedule module 102, the BS mode module 104, and the BS timing module 106 can generate respectively the static schedule signal $SCH_{BS}$, the mode signal $MODE_{BS}$, and the clock signal $CLOCK_{BS}$.

The BS static schedule module 102 can set and/or determine a static schedule 110 based on the mode signal $MODE_{BS}$ and/or the clock signal $CLOCK_{BS}$ and store the static schedule 110 in a BS memory 112. The static schedule 110 includes allocated uplink and downlink times for each of the client devices 14 connected to (i.e. has an established link with) the BS 12. Communication time of the BS 12 can be divided up into periodic time intervals. Each of the client devices 14 can be allocated a certain number of uplink and downlink times during each of the periodic time intervals.

As an example, the static schedule 110 can be determined for a client device when the client device is in the active mode and/or the sleep mode. In one implementation, the static schedule 110 is not determined during the standby mode of the client device. Although the BS memory 112 is shown as being included in the BS tracking module 16, the BS memory 112 can be included in the BS control module 32, the BS MAC 34, and/or the BS PHY 36. The BS memory 112 can be separate from the BS 12, the BS tracking module 16, the BS control module 32, the BS MAC 34 and/or the BS PHY 36 and accessed accordingly.

The BS static schedule module 102 can modify the static schedule 110 including changing the number of allocated uplink and downlink times associated with one or more of the client devices 14: as the client devices 14 change operating modes (including changing between the active, sleep, and standby modes), establish links with the BS 12, as links between the BS 12 and the client devices 14 are lost, at predetermined and/or periodic times, and/or based on priority levels of the client devices 14.

The BS static schedule module 102 can set the priority levels for the client devices 14 linked to the BS 12. The priority levels can be based on, for example: amounts of data to be transmitted to the client devices 14, traffic levels between the BS 12 and the client devices 14, and/or predetermined priority level rankings assigned to the client devices 14. A first client device that is to receive more data from the BS 12 than a second client device can have a higher priority level than the second client device. A client device with a higher priority level can be provided with more uplink and downlink times per periodic time interval than a client device with a lower priority level.

As another example, a first client device that is associated with a higher traffic level than a second client device can receive a higher priority level than the second client device. A client device with a high predetermined priority level ranking can receive more uplink and/or downlink times per periodic time interval than a client device with a low predetermined priority level ranking. The client device with the high predetermined priority level ranking can receive more uplink and/or downlink times regardless of the amount of data to be transmitted to the client device and/or the amount of traffic associated with the client device.

The BS mode module 104 coordinates operating modes of the client devices 14 with the client devices 14. Mode request and/or response signals are transmitted between the BS mode module 104 and the client devices 14. The BS mode module 104 can receive mode request signals from the client devices 14 and/or transmit mode request signals to the client devices 14. The BS mode module 104 can receive mode response signals from the client devices 14 and/or transmit mode response signals to the client devices 14.

A mode request signal can indicate: a next operating mode of a client device, a number of frames the client device is to remain in that operating mode, a start time of the next operating mode, and/or a finish time of the next operating mode. A mode request signal can be a request to operate in the next operating mode, as opposed to remaining in a current operating mode. A mode response signal can indicate or deny permission to operate in the next operating mode. A mode response signal can also indicate: a number of frames that a client device is to remain in that operating mode, a start time of the next operating mode, and/or a finish time of the next operating mode.

The BS mode module 104 can include a BS sleep module 114 and a BS standby module 116, which can receive and/or generate respective sleep mode request and/or response signals (collectively shown as $SleepIN_{CD}$, $SleepOUT_{BS}$) and standby mode request and/or response signals (collectively shown as $StanbyIN_{CD}$, $StandbyOUT_{BS}$). The BS sleep module 114 can select a number of frames S of time to remain in a sleep mode. The number of frames S can be: set by the BS mode module 104, determined based on a sleep mode request signal from a client device, determined based on a first mode timing signal $MODETIME_{INCD}$, transmitted in a sleep mode request signal (e.g., $SleepOUT_{BS}$), and/or transmitted in a second mode timing signal $MODETIME_{OUTBS}$. The first mode timing signal $MODETIME_{INCD}$ and the second mode timing signal $MODETIME_{OUTBS}$ can include a start time of a next operating mode of a client device and/or a finish time of the next operating mode. The mode timing signals $MODETIME_{INCD}$, $MODETIME_{OUTBS}$ can be included in the sleep mode request and/or response signals $SleepIN_{CD}$, $SleepOUT_{BS}$.

The BS standby module 116 can determine when a client device is to wake up, which can include activating a client transmitter and/or client receiver (e.g., the client transmitter 52 and the client receiver 54). This can occur, for example, when the BS 12 has data to send to the client device. Data associated with each of the client devices 14 can be stored in respective client queues 120 of the BS memory 112. Although the number of frames S can be set or determined when a client device is to operate in the sleep mode, the number of frames S can be set or determined when the client device is to operate in the standby mode. The BS standby module 116 can set the number of frame S equal to zero to indicate that the client device is to operate in the standby mode. By setting the number of frames S equal to zero and transmitting the number of frames S to the client device in a standby request signal (e.g., $StandbyOUT_{BS}$) or a mode timing signal (e.g., $MODETIME_{OUTBS}$), the client device can then operate in the standby mode.

Alternatively, the BS standby module 116 can receive a standby request signal (e.g., $StandbyIN_{CD}$) or a mode timing signal (e.g., $MODETIME_{INCD}$) indicating that the number of frames S is zero. By indicating the number of frames S is equal to zero, the standby request signal and/or the mode timing signal from the client device can request operation in the standby mode and/or indicate that the client device is to transition to the standby mode. The client device can transition to the standby mode based on a standby response signal (e.g., $StandbyOUT_{BS}$) from the BS 12 or transition to the standby mode regardless of whether the BS 12 sends a standby response signal to the client device.

The BS mode module 104, the BS sleep module 114, and the BS standby module 116 can generate the mode signal $MODE_{BS}$, the sleep mode signal $SleepOUT_{BS}$, the standby mode signal $StandbyOUT_{BS}$, and the mode timing signal $MODETIME_{OUTBS}$ based on the sleep mode signal $SleepIN_{CD}$, the standby mode signal $StandbyIN_{CD}$, the mode timing signal $MODETIME_{INCD}$, the clock signal $CLOCK_{BS}$ and/or a traffic signal $TRAF_{BS}$. The BS timing module 106 can include a clock generator 122 that generates the clock signal $CLOCK_{BS}$. Modules and devices of the BS can operate based on the clock signal $CLOCK_{BS}$. The clock signal $CLOCK_{BS}$ can be shared with the client devices 14. The clock signal $CLOCK_{BS}$ can be transmitted to the client devices 14 as part of pilot signals, as part of the mode timing signal $MODETIME_{OUTBS}$, or as part of another suitable signal.

The BS traffic module 108 can generate the traffic signal $TRAF_{BS}$. The traffic signal $TRAF_{BS}$ can be generated based on the signals $DataIN_{CD}$, $DataOUT_{BS}$. The traffic signal $TRAF_{BS}$ indicates a current amount of traffic between the BS 12 and one or more of the client devices 14. As an example, the BS sleep module 114 and BS standby module 116 can respectively determine whether a client device is to operate in the sleep mode and the standby mode based on the traffic signal $TRAF_{BS}$. If there is a large amount of traffic between the BS 12 and the client device, the BS sleep module 114 and the BS standby module 116 can respectively determine not to request operation of the client device in the sleep mode and the standby mode.

If the traffic level is less than a first predetermined level, the BS sleep module 114 can: determine that the client device should operate in the sleep mode, transmit a sleep mode response signal indicating permission to operate in the sleep mode, and/or determine the number of frames S based on the traffic level. If the traffic level is less than a second predetermined level for a predetermined period or there is no traffic for the predetermined period, the BS standby module 116 can: determine that the client device should operate in the standby mode, transmit a standby mode response signal indicating permission to operate in the standby mode, and/or set the number of frames S to zero.

The BS tracking module 16 can further include a BS link module 124. The BS link module 124 can track links between the BS 12 and the client devices 14. The BS link module 124 can setup the links, maintain the links, cancel links and/or determine when links are lost. The links can be setup, maintained and/or cancelled based on the operating mode of a client device. As an example, the BS link module 124 can setup, maintain and/or cancel a link with the client device based on the mode signal $MODE_{BS}$. A link can be maintained during the sleep mode and can be cancelled and/or lost during the standby mode. The BS link module 124 can receive and transmit link signals $LINK_{CD}$, $LINK_{BS}$ when establishing a link with the client device. While establishing a link, information is exchanged between the BS 12 and the client device including, for example, addresses of the BS 12 and the client device, communication protocols of the BS 12 and/or client device, transmission speeds of the BS 12 and/or client device, security information, and/or other link information. The link information can be provided in the link signals $LINK_{CD}$, $LINK_{BS}$.

In general, in order for a client device to maintain a link between the BS 12 and the client device, the client device can communicate with the BS 12 during at least one uplink time and one downlink time of each of the periodic time intervals of the BS 12. However, when operating in the sleep mode, a link between the BS 12 and the client device can be maintained without the client device communicating with the BS 12 during an uplink time and/or a downlink time.

Figure 4:
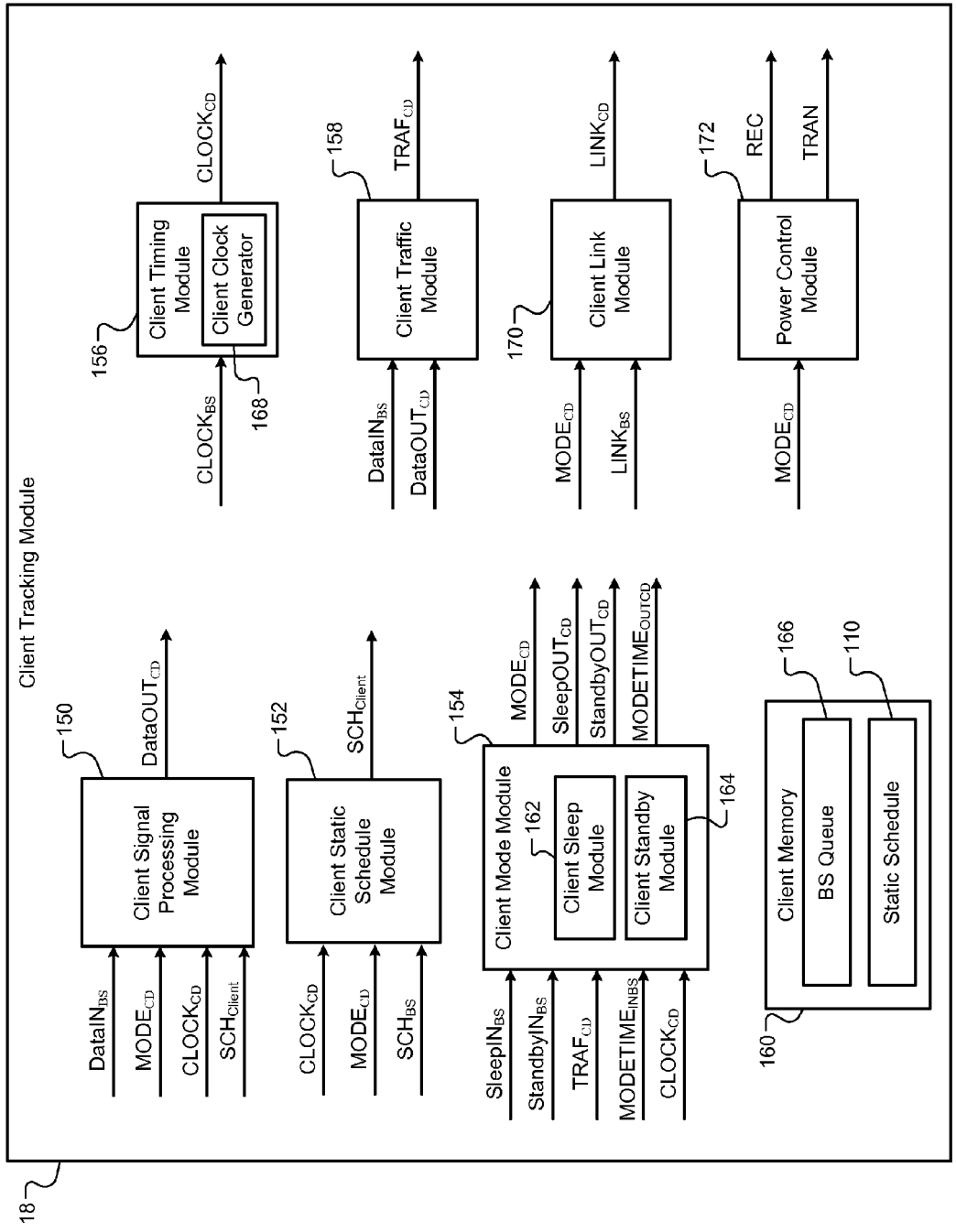
FIG. 4 is a functional block diagram of a client tracking module in accordance with the present disclosure.

Referring now also to FIG. 4, the client tracking module 18 is shown. The client tracking module 18 coordinates with the BS 12 timing of the active, sleep, and standby modes of the client device 14. The client tracking module 18 can include a client signal processing module 150, a client static schedule module 152, a client mode module 154, a client timing module 156 and a client traffic module 158. The client signal processing module 150 receives signals from and transmits signals to the BS 12. The signals received from and transmitted to the BS 12 can include, for example, the above-described data signals, pilot signals, mode request and/or response signals, beacon (or wake up) signals, link establishing signals, or other communication signals (collectively shown as $DataIN_{BS}$ and $DataOUT_{CD}$).

The client signal processing module 150 can receive signals from and transmit signals to the BS 12 based on the static schedule signal $SCH_{CD}$, a mode signal $MODE_{CD}$, and/or a clock signal $CLOCK_{CD}$. The client static schedule module 152 can generate the static schedule signal $SCH_{CD}$ based on the static schedule signal $SCH_{BS}$. The client timing module 156 can generate the clock signal $CLOCK_{CD}$ based on the clock signal $CLOCK_{BS}$. The static schedule signal $SCH_{BS}$ and the clock signal $CLOCK_{BS}$ can be received from the BS 12 as part of for example, a pilot signal and/or can be transmitted as part of another suitable signal.

The client static schedule module 152 can determine the static schedule 110 and/or uplink and downlink times for the client device 14 based on the static schedule signal $SCH_{BS}$, the mode signal $MODE_{CD}$ and/or the clock signal $CLOCK_{CD}$. As an example, the static schedule 110 and/or uplink and downlink times can be determined when in the active mode and/or the sleep mode. In one implementation, the static schedule 110 and/or uplink and downlink times are not determined during the standby mode.

The static schedule 110 and/or uplink and downlink times of the client device 14 can be stored in a client memory 160. In addition to determining the uplink and downlink times of the client device 14, the client static schedule module 152 can determine the uplink and downlink times of other client devices in communication with the BS 12 based on the static schedule signal $SCH_{BS}$. Communication with the BS 12 and/or other devices external to the client device 14 can be timed based on the uplink and/or downlink times of the other client devices to minimize interference.

Also, although the client memory 160 is shown as being included in the client tracking module 18, the client memory 160 can be included in the client control module 44, the client MAC 46, and/or the client PHY 48. The client memory 160 can be separate from the client device 14, the client tracking module 18, the client control module 44, the client MAC 46 and/or the client PHY 48 and accessed accordingly.

The client mode module 154 coordinates operating modes of the client device 14 with the BS 12. Mode request and/or response signals are transmitted between the client mode module 154 and the BS 12. The client mode module 154 can receive mode request signals from the BS 12 and/or transmit mode request signals to the BS 12. The client mode module 154 can receive mode response signals from the BS 12 and/or transmit mode response signals to the BS 12. A mode request signal can indicate: a next operating mode of the client device 14, a number of frames that the client device 14 is to remain in during an operating mode, a start time of the next operating mode, and/or a finish time of the next operating mode. A mode response signal can indicate: a number of frames that the client device 14 is to remain in an operating mode, a start time of the next operating mode, and/or a finish time of the next operating mode.

The client mode module 154 can include a client sleep module 162 and a client standby module 164, which can receive and/or generate respective sleep mode request and/or response signals (collectively shown as $SleepIN_{BS}$, $SleepOUT_{CD}$) and standby mode request and/or response signals (collectively shown as $StanbyIN_{BS}$, $StandbyOUT_{CD}$). The client sleep module 162 can select the number of frames S of time to remain in a sleep mode. The number of frames S can be: set by the client mode module 154, determined based on a sleep mode request signal from the BS 12, determined based on a first mode timing signal $MODETIME_{INBS}$, and/or transmitted in the sleep mode request signal $SleepOUT_{CD}$ and/or a second mode timing signal $MODETIME_{OUTCD}$. The first mode timing signal $MODETIME_{INBS}$ and the second mode timing signal $MODETIME_{OUTCD}$ can include a start time of a next operating mode of the client device 14 and/or a finish time of the next operating mode. The mode timing signals $MODETIME_{INBS}$, $MODETIME_{OUTCD}$ can be included in the sleep mode request and/or response signals $SleepIN_{BS}$, $SleepOUT_{CD}$.

The client standby module 164 can determine when the client device 14 is to wake up, which can include activating the client transmitter 52 and/or the client receiver 54. This can occur, for example, when the client device 14 has data to send to the BS 12 and/or during periodic beacon (or wake up) periods. Data to be transmitted to the BS 12 can be stored in a BS queue 166 of the client memory 160. Although the number of frames S can be set or determined when the client device 14 is to operate in the sleep mode, the number of frames S can be set or determined when the client device 14 is to operate in the standby mode. The client standby module 164 can set the number of frames S equal to zero to indicate that the client device 14 is to operate in the standby mode. By setting the number of frames S equal to zero and transmitting the number of frames S to the BS 12 in a standby request signal (e.g., StandbyOUT$_{CD}$) or a mode timing signal (e.g., MODETIME$_{OUTCD}$), the client device 14 is requesting operation in and/or indicating operation in the standby mode.

Alternatively, the client standby module 164 can receive a standby request signal (e.g., StandbyIN$_{BS}$) or a mode timing signal (e.g., MODETIME$_{INBS}$) indicating that the number of frames S is zero. By indicating the number of frames S is equal to zero, the standby request signal and/or the mode timing signal from the BS 12 can request operation in the standby mode and/or indicate that the client device 14 is to transition to the standby mode. The client device 14 can transition to the standby mode based on a standby response signal (e.g., StandbyOUT$_{BS}$) from the BS 12 or can transition to the standby mode regardless of whether the BS 12 sends a standby response signal to the client device 14.

The client mode module 154, the client sleep module 162, and the client standby module 164 can generate the mode signal MODE$_{CD}$, the sleep mode signal SleepOUT$_{CD}$, the standby mode signal StandbyOUT$_{CD}$, and the mode timing signal MODETIME$_{OUTCD}$ based on the sleep mode signal SleepIN$_{BS}$, the standby mode signal StandbyIN$_{BS}$, the mode timing signal MODETIME$_{MS}$, the clock signal CLOCK$_{CD}$ and/or a traffic signal TRAF$_{CD}$. The client timing module 156 can include a client clock generator 168 that generates the clock signal CLOCK$_{CD}$. The clock signal CLOCK$_{CD}$ can be generated based on the clock signal CLOCK$_{BS}$. Modules and devices of the client device 14 can operate based on the clock signal CLOCK$_{CD}$.

The client traffic module 158 can generate the traffic signal TRAF$_{CD}$. The traffic signal TRAF$_{CD}$ can be generated based on the signals DataIN$_{BS}$, DataOUT$_{CD}$. The traffic signal TRAF$_{CD}$ indicates a current amount of traffic between the BS 12 and the client device 14. As an example, the client sleep module 162 and client standby module 164 can respectively determine whether the client device 14 is to operate in the sleep mode and the standby mode based on the traffic signal TRAF$_{CD}$.

If there is a large amount of traffic, the client sleep module 162 and the client standby module 164 can respectively determine not to operate in the sleep mode and the standby mode. If the traffic level is less than a first predetermined level, the sleep module 162 can: determine that the client device 14 should operate in the sleep mode, transmit a sleep mode request signal to the BS 12, and/or determine the number of frames S based on the traffic level. If the traffic level is less than a second predetermined level for a predetermined period or there is no traffic for the predetermined period, the client standby module 164 can: determine that the client device 14 should operate in the standby mode, transmit a standby mode request signal to the BS 12, and/or set the number of frames S to zero.

The client tracking module 18 can further include a client link module 170 and a power control module 172. The client link module 170 can track link(s) between the BS 12 and the client device 14. The client link module 170 can setup the link(s), maintain the link(s), cancel the link(s) and/or determine when the link(s) are lost. The link(s) can be setup, maintained and/or cancelled based on the operating mode of a client device 14. As an example, the client link module 170 can setup, maintain and/or cancel a link with the BS 12 based on the mode signal MODE$_{CD}$. A link can be maintained during the sleep mode and can be cancelled and/or lost during the standby mode. The client link module 170 can receive and transmit link signals LINK$_{BS}$, LINK$_{ED}$ when establishing a link with the BS 12, as described above.

The power control module 172 can generate the receiver power signal REC and the transmitter power signal TRAN bas based on the mode signal MODE$_{CD}$. The receiver power signal REC and the transmitter power signal TRAN can be transmitted respectively to can activate and/or deactivate the client receiver 54 and the client transmitter 52.

The power control module 172 can deactivate the client receiver 54 and the client transmitter 52 during the sleep and standby modes and reactivate the client receiver 54 and the client transmitter 52 during the active mode, as described above. During the standby mode, the power control module 172 can activate the client receiver 54 while maintaining the client transmitter 52 in an OFF state to detect a wake up signal during a wake up period. The power control module 172 can deactivate the client receiver 54 if a wake up signal is not detected by the client device 14 for a predetermined period. If the wake up signal is detected, the client receiver 54 can be maintained in an active state and the client transmitter 52 can be activated.

Static Schedule Frequency Adjustment

Figure 5:
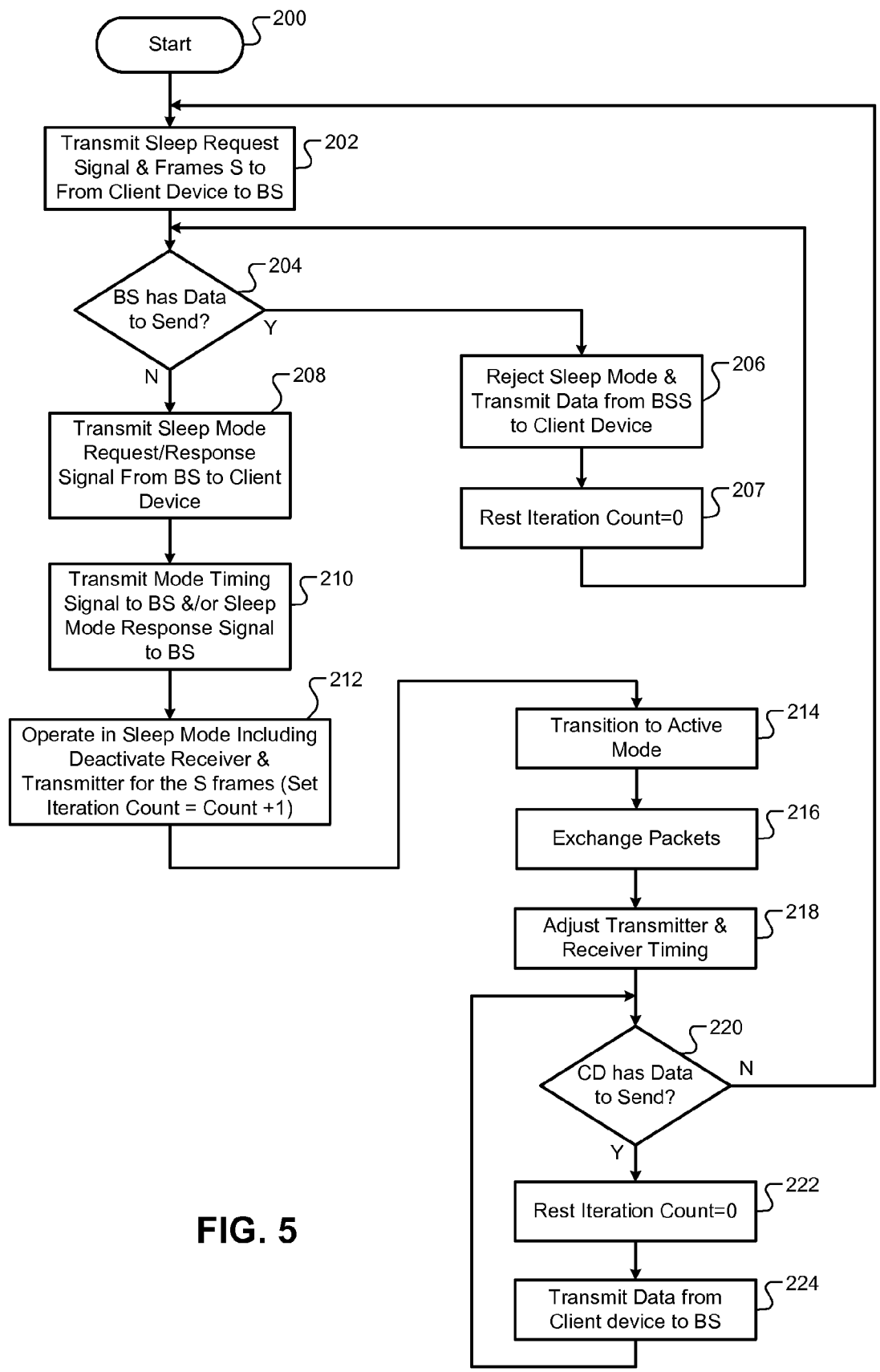
FIG. 5 is a logic flow diagram illustrating a static schedule frequency adjusting technique in accordance with the present disclosure.
Figure 6:
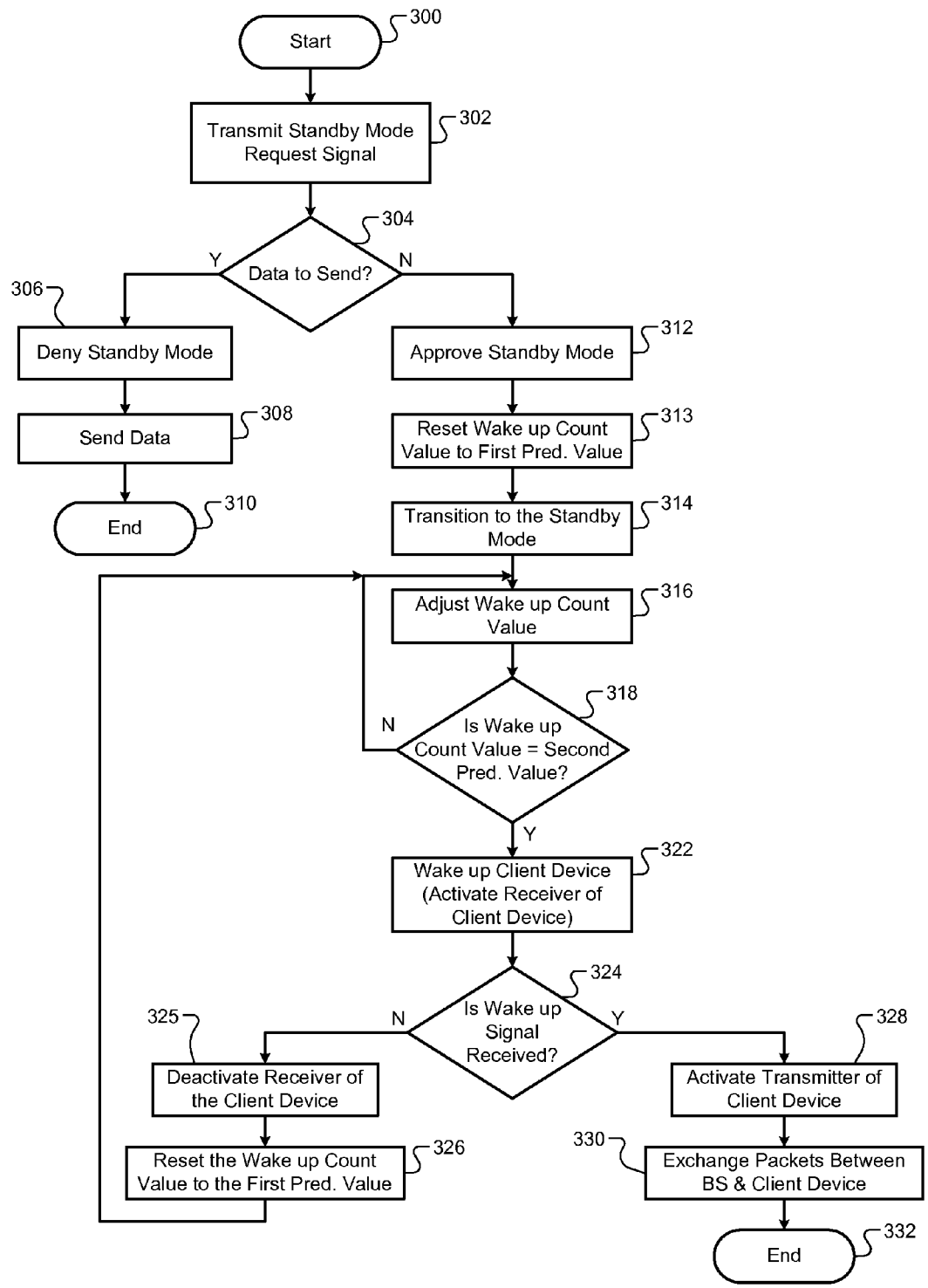
FIG. 6 is a logic flow diagram illustrating a static schedule disabling technique in accordance with the present disclosure.

The above-described wireless MIMO network 10 can be operated using numerous techniques, example techniques (or computer-implemented methods or algorithms) are provided in FIGS. 5 and 6. In FIG. 5, a static schedule frequency adjusting technique is shown. The static schedule frequency adjusting technique can include reducing and/or increasing uplink and downlink frequencies of the client device 14 within the periodic time interval of the BS 12.

Although the following tasks are primarily described with respect to the implementations of FIGS. 2-4, the tasks can be easily modified to apply to other implementations of the present disclosure. The tasks can be iteratively performed. Any of the values used and/or determined in the following tasks can be stored in the BS memory 112 and/or client memory 160 and/or accessed by any of the modules and devices of the BS 12 and client device 14. The technique can begin at 200 and can be referred to as a sleep mode procedure. During the sleep mode procedure, frequency of uplink and downlink and/or static schedule times of the client device 14 are adjusted, which adjusts one or more duty cycles of the client device 14. Each of the duty cycles refers to the ON time versus OFF time of a device. Each of the duty cycles can be associated with one or more of the client transmitter 52, the client receiver 54, and/or other modules and devices of the client device 14.

At 202, the client signal processing module 150 and/or client mode module 154 can transmit a packet or a sleep mode request signal to the BS 12 requesting operation in the sleep mode. This can occur when the client device 14 no longer has data to transmit to the BS 12, the BS 12 is no longer transmitting data to the client device 14, and/or the client device 14 initiates an energy efficient mode. The client device 14 can transmit the number of frames S to operate in the sleep mode in an uplink signal (e.g., the SleepOUT$_{CD}$) and during an allocated uplink time of the client device 14. The larger the number of frames S, the more the duty cycle of the client device 14 is reduced.

In subsequent iterations of the procedure, the client device 14 can send the number of frames S of time (frames for previous iteration) or S=S+N frames of time (frames for current iteration), where N can be a positive or negative integer. The number of frames S+N can be less than or greater than the number of frames S. See the Subsequent Iterations section below.

At 204, upon receiving the sleep mode request, the BS 12 can check the client queue (e.g., one of the client queues 120) allocated to the client device 14 and/or determine if there is any data to be transmitted to the client device 14. If there is data to be transmitted to the client device 14, task 206 is performed, otherwise task 208 is performed.

At 206, the BS 12 rejects the sleep mode request as indicated in a sleep mode response signal and transmits the data in the client queue to the client device 14. The BS 12 can return to task 204 and approve the sleep mode request after transmitting the data to the client device 14. At 207, an iteration count can be reset to zero. The iteration count refers to the number of successive times the client device 14 has operated in the sleep mode. The BS tracking module 16 and/or the client tracking module 18 can track the iteration count. At 208, if there is no data to be transmitted to the client device 14, the BS 12 can generate a sleep mode response signal approving the request to enter the sleep mode.

Task 202 may not be performed if the BS 12 initiates the request to operate in the sleep mode. If task 202 is not performed, the BS 12 can transmit a sleep mode request signal to the client device 14 at 208 instead of transmitting the sleep mode response signal. The sleep mode request signal generated by the BS 12 can include the number of frames S.

At 210, the client device 14 can then respond to the BS 12 indicating when the number of frames S of time is to begin by transmitting a mode timing signal $MODETIME_{OUTCD}$ to the BS 12. As an alternative, the BS 12 can send a mode timing signal $MODETIME_{OUTBS}$ to the client device 14 indicating when the number of frames S of time is to begin and/or when to start an S frame count. The S frame count refers to the BS 12 (i) counting and/or waiting S frames of time or a predetermined period before communicating with the client device 14 and/or (ii) waiting a predetermined period based on the S frames of time before allocating time slots in a periodic time interval for the client device 14.

If at 208, the BS 12 transmits a sleep mode request signal to the client device 14, the client device at 210 can transmit a sleep mode response signal to the BS 12. The sleep mode response signal transmitted to the BS 12 can approve operation in the sleep mode if the client device 14 does not have data to send to the BS 12. Alternatively, the sleep mode response signal can approve operation in the sleep mode regardless of whether the client device 12 has data to send to the BS 12. Transmission and reception of the mode timing signal $MODETIME_{OUTCD}$ can in and of itself indicate approval of the sleep mode and thus can be referred to as an initiate signal. The mode timing signal $MODETIME_{OUTCD}$ and the mode timing signal $MODETIME_{OUTBS}$ can indicate when the sleep mode is to begin and/or end, as described above.

A 3-way handshake can thus be performed when the client device 14 initiates the sleep mode request, as described above. The 3-way handshake includes a sleep mode request signal, a sleep mode response signal, and mode timing signal. A 2-way handshake can be performed when the BS 12 initiates the sleep mode request, as also described above. The 2-way handshake can be similar to the 3-way handshake without the sleep mode request signal being initially transmitted from, for example, the client device 14 to the BS 12.

At 212, the client device 14 transitions to and operates in the sleep mode and the power control module 172 deactivates the client transmitter 52 and client receiver 54 for the number of frames S of time. The iteration count can be incremented by 1 via the BS tracking module 16 and/or the client tracking module 18. The BS 12 remains powered during the sleep mode. The BS 12 waits the number of frames S prior to attempting to transmit signals and/or data to the client device 14.

At 214, subsequent to the number of frames S of time, the client device 14 can transition from the sleep mode back to the active mode and reactivate (i.e. power ON) the client transmitter 52 and/or client receiver 54. At 216, the client device 14 can then exchange packets with the BS 12 in static scheduled frames of the client device 14, as the link between the BS 12 and the client device 14 was not lost when the client device 14 was in the sleep mode. The static scheduled frames allocated to the client device 14, prior to entering the sleep mode, can be the same as or different than the static scheduled frames allocated subsequent to the sleep mode.

At 218, the client device 14 can receive instructions from the BS 12 to adjust transmitter and/or receiver timing of the client device 14 according to frame allocation times of an updated static schedule.

At 220, the client tracking module 18 can determine whether the client device 14 has data to send to the BS 12. If the client device 14 has data to send to the BS 12, task 222 is performed. If the client device 14 does not have data to send, the client device can return to 204 to reinitiate the sleep mode. At 222, the iteration count can be reset to zero. At 224, the client device 14 transmits data in the client queue BS queue 166 to the BS 12 in allocated time slots. The client device 14 can return to task 220 after task 224.

Subsequent Iterations

During subsequent iterations of the sleep mode procedure, the client device 14 can request that the client device 14 remain in the sleep mode for the S+N frames. In one implementation, the number of frames $S_x$ that the client device 14 requests to be in the sleep mode can exponentially increase for each successive iteration of the sleep mode procedure. X is the iteration number. A back-off algorithm can be used such that the number of frames $S_x$ increases by a predetermined amount for each successive iteration. For example, a first number of frames $S_1$ can be set a first predetermined number for a first iteration. The number of frames requested in each subsequent iteration can be a multiple of $S_1$. As an example, equation 1 can be used to determine the number of frames based on the iteration X.

$$S_X = 2 \cdot 2^X \quad (1)$$

When using equation 1, the number of frames $S_x$ for each iteration can be represented, for example, as $[S_1, S_2, S_3, S_4, \ldots, S_T] = [4, 8, 16, 32, \ldots, 512]$, where T is the total number of iterations and the first iteration has 4 frames and the last iteration has 512 frames. The first number of frames $S_1$, the last or maximum number of frames $S_T$, the increments in S between $S_1$ and $S_T$, and/or the number of iterations X can be predetermined and/or adjusted.

The back-off algorithm helps the client device 14 progressively enter a more energy efficient stage, as the client device 14 remains in the sleep mode progressively longer for each subsequent iteration. By progressively increasing the number of frames S that the client device 14 is in the sleep mode, responsiveness of the client device 14 is maintained or maximized while reducing average "wake up" times of the client device 14 or time until the client device 14 is reactivated. The amount of time that the client device is in the active mode (or awake) increases with each iteration, as the client device 14 does not wake up during each of the sleep modes and the number of frames $S_x$ is increasing for each iteration. Thus, since the number of frames $S_x$ exponentially increases, the client device 14 is exponentially less responsive for each additionally performed iteration. Also, since the client device 14 communicates the number of frames $S_x$ to the BS 12, the link between the BS 12 and the client device 14 can be maintained during the sleep modes.

Since the client device 14 responds quicker when the iteration number is low and the link is maintained, response time is improved over a system that includes depowering a client device (i.e. transmitter and receiver of the client device) due to lack of communication activity between a BS and the client device. In this type of system, the client device can be depowered and a link between the BS and the client device can be lost. As a result, the link between the client device and the base station must be reestablished when the client device is powered back up, which increases response time.

The average wake up time for the above-described example, where the first iteration number of frames $S_1$ is 4 and the maximum number of iteration frames is 512, is approximately 300 ms with each of the frames being about 40 ms in length. The average wake up time can be less than an accuracy period of the clock signal $CLOCK_{ED}$ of the client device 14. The accuracy period refers to an amount of time that the clock signal $CLOCK_{CD}$ remains synchronized with the clock signal $CLOCK_{BS}$ when the client device 14 is in the sleep mode. The clock signal $CLOCK_{ED}$ may no longer be synchronized with the clock signal $CLOCK_{BS}$ subsequent to the accuracy period.

To further reduce the wake up time of the client device 14, the client transmitter 52 can be turned OFF and the client receiver 54 is maintained in an ON state or turned ON during the allocated static schedule times. This allows the client device 14 to fully wake up (i.e. activate the client transmitter 52) quickly based on a wake up signal, a data signal, and/or a static symbol from the BS 12. This reduces the wake up time to the time period of 1 frame (e.g., 30 ms). The more that the client receiver 54 is in an ON state, the more power consumed. Thus, the amount of time that the client receiver 54 is in an ON state can be minimized by turning the client receiver 54 ON during allocated static schedule periods and by maintaining the client receiver 54 in an OFF state during other time periods. To minimize receiver and/or transmitter ON times, the BS 12 can provide a static schedule with less frequent (i) uplink times and/or with no uplink times, and/or (ii) less frequent downlink times.

Static Schedule Turned OFF

The following static schedule disabling technique of FIG. 6 can be implemented along with the technique of FIG. 5. The technique of FIG. 6 can begin at 300. Task 300 can be performed subsequent to, for example, task 220 or any other task of FIG. 5.

At 302, the client device 14 (or the BS 12) can request operation of the client device 14 in the standby mode. This can include generating one of the above-described standby request signals and setting the number of frames S to zero. The client tracking module 18 and/or the BS tracking module 16 can request operation in the standby mode when: the client device 14 has been in the sleep mode for a first predetermined period; the number of frames S is equal to the maximum number of iteration frames (e.g., 512), a user of the client device 14 logs out of an application or the Internet, and/or the client device 14 and/or the BS 12 determines that the client device 14 is to be in the sleep mode or OFF for a second predetermined period. The second predetermined period can be equal to or different than the first predetermined period.

At 304, the BS 12 (or the client device 14) can determine whether there is data to send. If there is data to send, task 306 is performed. If there is not data to send, task 312 is performed.

At 306, the BS 12 (or the client device 14) denies operation in the standby mode by sending a standby response signal to the client device 14 (or BS 12). At 308, the client device 14 or BS 12 can send the data. The technique can end at 310.

At 312, the BS 12 (or the client device 14) can approve operation in the standby mode by transmitting a standby response signal to the client device 14 (or BS 12). At 313, the client tracking module 18 can reset a wake up count value to a first predetermined value. The first predetermined period can, for example, be greater than or equal to 1 second (s). The first predetermined value can be equal to an amount of time between wake up periods, beacons and/or beacon intervals. At 314, the client mode module 154 can transition to the standby mode including the mode signal MODE to indicate operation in the standby mode. The power control module 172 can deactivate the client receiver 54 and client transmitter 52. At 316, the client tracking module 18 can adjust (increment or decrement) the wake up count value.

At 318, the client tracking module 18 determines whether the wake up count value is equal to a second predetermined value (e.g., 0). If the wake up count value is not equal to the second predetermined value, task 316 is performed, otherwise task 322 is performed.

At 322, the power control module 172 can activate the client receiver 54 to detect a wake up signal from the BS 12. The power control module 172 can also activate the client transmitter 52. Prior to starting the standby mode, the client device 14 and/or the BS 12 can maintain channel information for a channel between the client device 14 and the BS 12. The channel information can include a mathematical representation of a channel used between the client device 14 and the BS 12. The updating of the channel information can include periodically updating the channel information at the client device 14 and/or at the BS 12.

Subsequent to starting the standby mode, the client device 14 can lose a communication link with and/or no longer be synchronized with the BS 12. As a result, channel information can be outdated and the BS 12 can have deleted previously stored channel information. Since the BS 12 no longer has the channel information of the client device 14, the BS 12 may not be able to communicate with the client device 14 using MIMO transmission (i.e. static scheduled times). In order to communicate with the client device 14, the BS 12 transmits a wake up request signal that includes an identifier of the client device 14, such as a unique identifier, an address, a key, and/or a password. The wake up request signal can be referred to as a long request signal and can be, for example, longer than a predetermined number of frames.

At 324, the client tracking module 18 determines whether a wake up signal has been received from the BS 12. Task 325 is performed when a wake up signal has not been received, otherwise task 328 is performed. If the detected wake up signal includes a client identifier of the client device 14, the client device 14 remains awake. At 325, the power control module 172 deactivates the client receiver 54 and the client transmitter 52 (if activated). At 326, the wake up count value can be reset to the first predetermined value, as at 313. Task 316 can be performed subsequent to task 326.

At 328, the power control module 172 can activate the client transmitter 52 if not already activated. At 330, packets can be exchanged between the client device 14 and the BS 12 to establish a link and to transfer data. This can include, for example, monitoring pilot signals, synchronizing the client transmitter 52 and the client receiver 54, detecting channel information, and/or adjusting frame, slot and symbol times. The client device 14 can receive a first pilot signal from the BS 12, compare the first pilot signal to a first reference pilot signal, and adjust receiver timing of the client device 14 based on the comparison.

The BS 12 can receive a second pilot signal from the client transmitter 52. The BS 12 can compare the second pilot signal to a second reference pilot signal, determine a timing offset based on the second comparison, and transmit a timing adjustment signal to the client device 14. The client device 14 can then adjust timing of (or tune) the client transmitter 52 based on the timing adjustment signal. This synchronizes receiver and transmitter timing of the client device 14 with the BS 12 and/or a static schedule of the BS 12. Reestablishing a link can also include, for example: determining frequencies of a channel; data rates for the client device 14 and/or the BS 12; data transfer protocols; and/or identifier, password and/or key transfer and verification of the client device 14 and/or BS 12.

The client device 14 and the BS 12 can also exchange packets to determine updated channel information. The above-described tasks to establish a link and update channel information can be performed by the client tracking module 18 and the BS tracking module 16 and/or one or more of the modules within the client tracking module 18 and the BS tracking module 16. The method can end at 332.

The above-described tasks of FIGS. 5 and 6 are meant to be illustrative examples; the tasks can be performed sequentially, synchronously, simultaneously, continuously, during overlapping time periods or in a different order depending upon the application. Also, any of the tasks may not be performed or skipped depending on the implementation and/or sequence of events.

Referring again to FIG. 2, the BS 12 and/or client device 14 can periodically: update channel information associated with a channel between the client device 14 and the BS 12; update channel information when there is no communication activity between the client device 14 and the BS 12 for a predetermined period; and/or update channel information subsequent to operating in the standby mode or during operation in the active mode. The updated channel information can be shared between the client device 14 and the BS 12.

Sleep and Standby Modes

During the above-described sleep and standby modes, the client control module 44 (or processor), the client MAC 46, and/or the client timing module 156 can be maintained in a powered ON state. The client clock generator 168 can generate the clock signal $CLOCK_{CD}$. By maintaining power of at least the client clock generator 168 and the timing module 156, the client device 14 and modules, processors, and/or devices therein are able to: remain synchronized with the BS 12; remain synchronized with the static schedule 110 of the BS 12; and/or wait predetermined periods before waking up and/or reactivating the client transmitter 52 and/or the client receiver 54. This allows minimal power to be consumed when in the sleep and standby modes. During the sleep and standby modes, the BS 12 can allocate time slots previously allocated for the client device 14 to other client devices. The BS 12 can reallocate the time slots back to the client device 14 subsequent to operating in the sleep and standby modes.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first" "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors.

In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
    communicating with a base station via a transmitter and a receiver of a first client device based on a static schedule, wherein:
        (i) the static schedule indicates an uplink time and a downlink time allocated to the first client device by the base station;
        (ii) the uplink time and the downlink time are associated with each of a plurality of frames of the base station;
        (iii) communication time between the base station and a plurality of client devices linked to the base station including the first client device is divided into periodic time intervals; and
        (iv) each of the periodic time intervals includes a respective one of the plurality of frames;
    selecting between operating in one of a sleep mode and a standby mode, wherein
        during the sleep mode, (i) the transmitter and the receiver are deactivated for a selected number S ones of the plurality of frames and (ii) the transmitter and the receiver are reactivated subsequent to the S ones of the plurality of frames, where S is an integer $S_1$, and
        during the standby mode, the transmitter and the receiver are deactivated until a wake up period in which the first client device reactivates the receiver to receive a wake up signal from the base station;
    transmitting a first mode request signal from the first client device to the base station via the transmitter, the first mode request signal performing one of: (i) requesting operation in the sleep mode for the S ones of the plurality of frames, and (ii) indicating operation in the standby mode;
    subsequent to transmitting the first mode request signal to request operation in the sleep mode, receiving a response signal from the base station permitting operation in the sleep mode;
    transmitting an initiate signal from the first client device to the base station via the transmitter based on the response signal, wherein the initiate signal indicates when to begin operating in the selected one of the sleep mode and the standby mode;
    after $S_1$ frames, setting, by the first client device, the selected number S equal to $S_x$, where $S_x$ is an integer exponentially greater than $S_1$,
    activating the transmitter; and transmitting a second mode request signal from the first client device to the base station via the transmitter, the second mode request signal comprising a request for operation in the sleep mode for the selected number S of the plurality of frames, where S is equal to $S_x$.

2. A computer-implemented method comprising:
communicating with a base station via a transmitter and a receiver of a first client device based on a static schedule, wherein:
(i) the static schedule indicates an uplink time and a downlink time allocated to the first client device by the base station;
(ii) the uplink time and the downlink time are associated with each of a plurality of frames of the base station; and
(iii) communication time between the base station and a plurality of client devices linked to the base station including the first client device is divided into the plurality of frames;
at least one of (a) receiving a first mode request signal transmitted from the base station to the first client device via the receiver, and (b) transmitting a second mode request signal from the first client device to the base station via the transmitter, the second mode request signal performing one of: (i) requesting operation in a sleep mode for a selected number S of the plurality of frames, where S is an integer $S_1$, and (ii) indicating operation in a standby mode; and;
receiving via the receiver, a response signal from the base station for operation in the sleep mode;
transmitting an initiate signal from the first client device to the base station via the transmitter, wherein the initiate signal indicates when to begin operating in the one of the sleep mode and the standby mode;
activating the sleep mode on the first client device, wherein activating the sleep mode comprises deactivating the transmitter;
after $S_1$ frames, setting, by the first client device, the selected number S equal to $S_x$, where $S_x$ is an integer exponentially greater than $S_1$;
activating the transmitter; and
transmitting a third mode request signal from the first client device to the base station via the transmitter, the third mode request signal comprising a request for operation in the sleep mode for the selected number S of the plurality of frames, where S is equal to $S_x$.

3. The computer-implemented method of claim 2, further comprising:
selecting operation in a standby mode.

4. The computer-implemented method of claim 3, further comprising:
during the standby mode, deactivating the transmitter and the receiver until a wake up period; and
prior to or during the wake up period, reactivating the receiver to receive a wake up signal from the base station.

5. The computer-implemented method of claim 4, deactivating the transmitter and the receiver based on whether the wake up signal is received by the first client device.

6. The computer-implemented method of claim 2, further comprising:
receiving the first mode request signal from the base station via the receiver; and
transmitting the initiate signal from the first client device to the base station via the transmitter and in response to the mode request signal.

7. The computer-implemented method of claim 2, further comprising:
maintaining channel information for a channel between the first client device and the base station during the sleep mode; and
ceasing from updating the channel information during the standby mode.

8. The computer-implemented method of claim 2, further comprising:
during the standby mode, deactivating the transmitter and the receiver until a wake up period;
prior to or during the wake up period reactivating the receiver to receive a wake up signal from the base station; and
in response to receiving the wake up signal, reactivating the transmitter.

9. The computer-implemented method of claim 2, further comprising:
selecting to operate the first client device in the standby mode;
setting the selected number S equal to 0;
transmitting a fourth mode request signal from the first client device to the base station including the selected number S, where S is equal to 0; and
deactivating the transmitter and the receiver based on operation in the standby mode.

10. The computer-implemented method of claim 2, further comprising:
receiving the first mode request signal from the base station;
transmitting a response signal to the base station in response to the first mode request signal based on whether the first client device has data to send to the base station; and
operating in one of the sleep mode and the standby mode based on (i) the first mode request signal, and (ii) whether the first client device has data to send to the base station.

11. The computer-implemented method of claim 2, wherein the second mode request signal:
is a time division multiplexed signal;
is transmitted at one of the uplink time and the downlink time of the first client device; and
is transmitted in television whitespace.

12. The computer-implemented method of claim 2, wherein the first client device communicates with the base station in a multiple input multiple output network.

13. The computer-implemented method of claim 2, wherein:
the plurality of frames are each split up into time slots;
the first client device is allocated an uplink symbol of time and a downlink symbol of time in each of the time slots; and
the second mode request signal is transmitted according to the static schedule of the base station and in one of (i) the uplink symbols of time, and (ii) the downlink symbols of time.

14. A computer-implemented method comprising:
communicating with a first client device via a transmitter and a receiver of a base station based on a static schedule, wherein:
(i) the static schedule indicates an uplink time and a downlink time allocated to the first client device by the base station;
(ii) the uplink time and the downlink time are associated with each of a plurality of frames of the base station; and (iii) communication time between the base station and a plurality of client devices linked to the base station including the first client device is divided into the plurality of frames;

at least one of (a) transmitting a first mode request signal from the base station to the first client device via the transmitter, the first mode request signal performing one of: (i) requesting operation of the first client device in a sleep mode for a selected number S of the plurality of frames, where S is an integer $S_1$, and (ii) indicating operation of the first client device in a standby mode, and (b) receiving a second mode request signal from the first client device at the base station via the receiver;

receiving via the receiver, a response signal from the first client device for operation in the sleep mode;

transmitting an initiate signal from the base station to the first client device via the transmitter, wherein the initiate signal indicates when to begin operating in the one of the sleep mode and the standby mode;

after $S_1$ frames, setting, by the base station, the selected number S equal to $S_x$, where $S_x$ is an integer exponentially greater than $S_1$; and transmitting a third mode request signal from the base station to the first client device via the transmitter, the third mode request signal comprising a request for operation of the first client device in the sleep mode for the selected number S of the plurality of frames, where S is equal to $S_x$.

15. The computer-implemented method of claim 14, further comprising:

receiving the second mode request signal from the first client device via the receiver; and transmitting an initiate signal from the base station to the first client device via the transmitter and in response to the mode request signal.

16. The computer-implemented method of claim 14, further comprising:

maintaining a link between the first client device and the base station during the sleep mode; and losing the link between the first client device and the base station during the standby mode.

17. The computer-implemented method of claim 14, further comprising:

maintaining channel information for a channel between the first client device and the base station during the sleep mode; and ceasing from updating the channel information during the standby mode.

18. The computer-implemented method of claim 14, further comprising:

determining whether the base station has data to send to the first client device;

transmitting a wake up signal to the first client device during a beacon interval to wake up the first client device during the standby mode; and exchanging packets with the client device to (i) reestablish a link between the client device and the base station, and (ii) update channel information for a channel between the first client device and the base station.

19. The computer-implemented method of claim 14, further comprising:

selecting to operate in the standby mode;

setting the selected number S equal to 0; and transmitting a fourth mode request signal to the first client device including the selected number S, where S is equal to 0, to deactivate at least one of a transmitter and a receiver of the first client device.

20. The computer-implemented method of claim 14, further comprising:

receiving the second mode request signal from the first client device;

generating a response signal to permit operation of the first client device in one of the sleep mode and the standby mode based on (i) the mode request signal, and (ii) whether the base station has data to send to the first client device; and transmitting the response signal to the first client device.

21. The computer-implemented method of claim 14, wherein the first mode request signal:

is a time division multiplexed signal;

is transmitted at one of the uplink time and the downlink time of the first client device; and is transmitted in television whitespace.

22. The computer-implemented method of claim 14, wherein the base station communicates with the first client device in a multiple input multiple output network.

23. The computer-implemented method of claim 14, wherein:

the plurality of frames are each split up into time slots;

the first client device is allocated an uplink symbol of time and a downlink symbol of time in each of the time slots; and the first mode request signal is transmitted according to the static schedule of the base station and in one of (i) the uplink symbols of time, and (ii) the downlink symbols of time.

24. The computer-implemented method of claim 14, further comprising:

after $S_x$ frames, comparing $S_x$ to a maximum number of frames $S_T$;

in response to the comparison, setting the selected number S equal to 0;

transmitting from the base station to the first client device, a fourth mode request signal comprising the selected number S, where S is equal to 0, and a request for the client device to operate in the standby mode, wherein the fourth mode request signal deactivates at least one selected from the group consisting of a transmitter and a receiver of the first client device, based on whether the first client device has data to send to the base station.

\* \* \* \* \*